United States Patent
Courtright et al.

(10) Patent No.: US 6,493,776 B1
(45) Date of Patent: Dec. 10, 2002

(54) SCALABLE ON-CHIP SYSTEM BUS

(75) Inventors: David A. Courtright, Los Gatos; Vidya Rajagopalan, San Carlos; Radhika Thekkath, Palo Alto; G. Michael Uhler, Redwood City, all of CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 09/373,091

(22) Filed: Aug. 12, 1999

(51) Int. Cl.$^7$ ............................ G06F 9/46; G06F 13/40
(52) U.S. Cl. ........................................ 710/110; 710/105
(58) Field of Search .............................. 710/110, 107, 710/305, 52, 310; 711/211, 100; 370/402, 464

(56) References Cited

U.S. PATENT DOCUMENTS

| | | |
|---|---|---|
| 4,587,609 A | 5/1986 | Boudreau et al. |
| 4,998,198 A | 3/1991 | Chan |
| 5,091,846 A | 2/1992 | Sachs et al. |
| 5,255,378 A | 10/1993 | Crawford et al. |
| 5,347,648 A | 9/1994 | Stamm et al. |
| 5,428,753 A | 6/1995 | Kondo et al. |
| 5,463,762 A | 10/1995 | Morrissey |
| 5,504,874 A | 4/1996 | Galles |
| 5,525,971 A | 6/1996 | Flynn |
| 5,579,530 A | 11/1996 | Solomon et al. |
| 5,581,782 A | 12/1996 | Sarangdhar et al. ........ 395/800 |
| 5,615,404 A | 3/1997 | Knoll et al. ................ 395/882 |
| 5,696,976 A | 12/1997 | Nizar et al. ................ 395/739 |
| 5,724,549 A | 3/1998 | Selgas et al. |
| 5,751,975 A | 5/1998 | Gillespie et al. ............ 395/306 |
| 5,768,612 A | 6/1998 | Nelson ........................ 395/800 |
| 5,778,412 A | 7/1998 | Gafken ........................... 711/5 |
| 5,781,745 A | 7/1998 | Ramelson |
| 5,787,486 A | 7/1998 | Chin et al. |
| 5,796,977 A | 8/1998 | Sarangdhar ................ 395/406 |
| 5,799,203 A | 8/1998 | Lee et al. |
| 5,802,560 A | 9/1998 | Joseph et al. |
| 5,828,865 A | 10/1998 | Bell ........................... 395/500 |
| 5,832,310 A | 11/1998 | Morrissey et al. |
| 5,859,986 A | 1/1999 | Marenin |
| 5,892,978 A | 4/1999 | Munguia et al. |
| 5,918,072 A | 6/1999 | Bhattacharya |
| 5,996,036 A * | 11/1999 | Kelly |
| 6,034,542 A | 3/2000 | Ridgeway |
| 6,035,364 A | 3/2000 | Lambrecht et al. |
| 6,044,225 A | 3/2000 | Spencer et al. |
| 6,085,261 A | 7/2000 | McIntyre, Jr. et al. |
| 6,122,690 A | 9/2000 | Nannetti |
| 6,134,481 A | 10/2000 | Warren |
| 6,138,176 A | 10/2000 | McDonald et al. |
| 6,108,734 A | 11/2000 | Shand |
| 6,173,349 B1 * | 1/2001 | Qureshi et al. |
| 6,185,637 B1 | 2/2001 | Strongin et al. |
| 6,301,625 B1 | 10/2001 | McDonald et al. |
| 6,321,284 B1 | 11/2001 | Shionohara et al. |

* cited by examiner

*Primary Examiner*—Gopal C. Ray
(74) *Attorney, Agent, or Firm*—James W. Huffman

(57) ABSTRACT

An on-chip split transaction system bus having separate address and data portions is provided. The system bus contains separate address and data buses for initiating and tracking out-of-order transactions on either or both of the address or data portions of the bus. The system bus provides communication via a bus interface that includes split transaction tracking and control to establish transaction ID's for each transaction initiated by the bus interface, and to determine whether data appearing on the data portion of the system bus is associated with one of its pending transactions. The bus interface also contains flow control logic to determine whether devices that are to be read from, or written to, by the bus interface, have resources (buffers) available to respond to the transactions. If the resources are available, the flow control logic allows the transactions to proceed, and adjusts its counters to reflect the use of the resources. If the resources are not available, the flow control logic causes the transactions to wait until the resources become available.

28 Claims, 10 Drawing Sheets

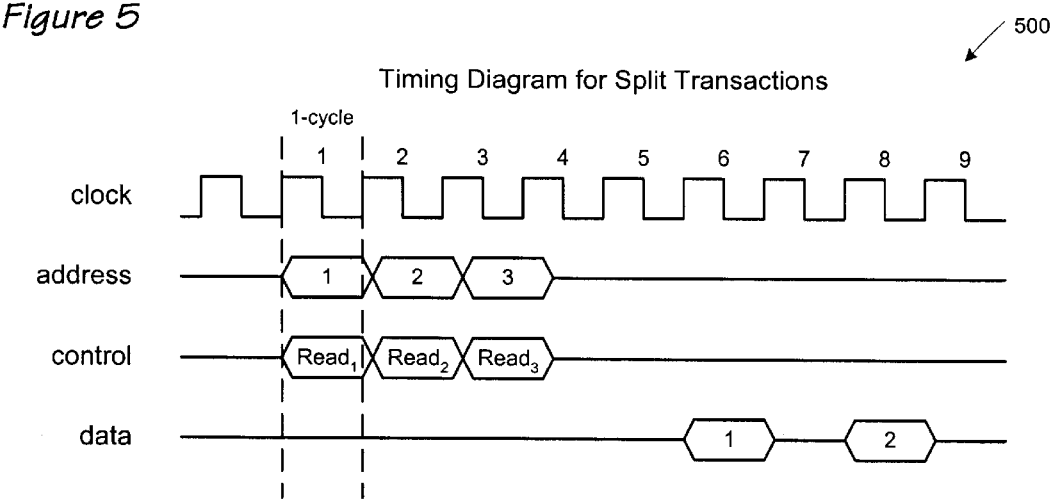
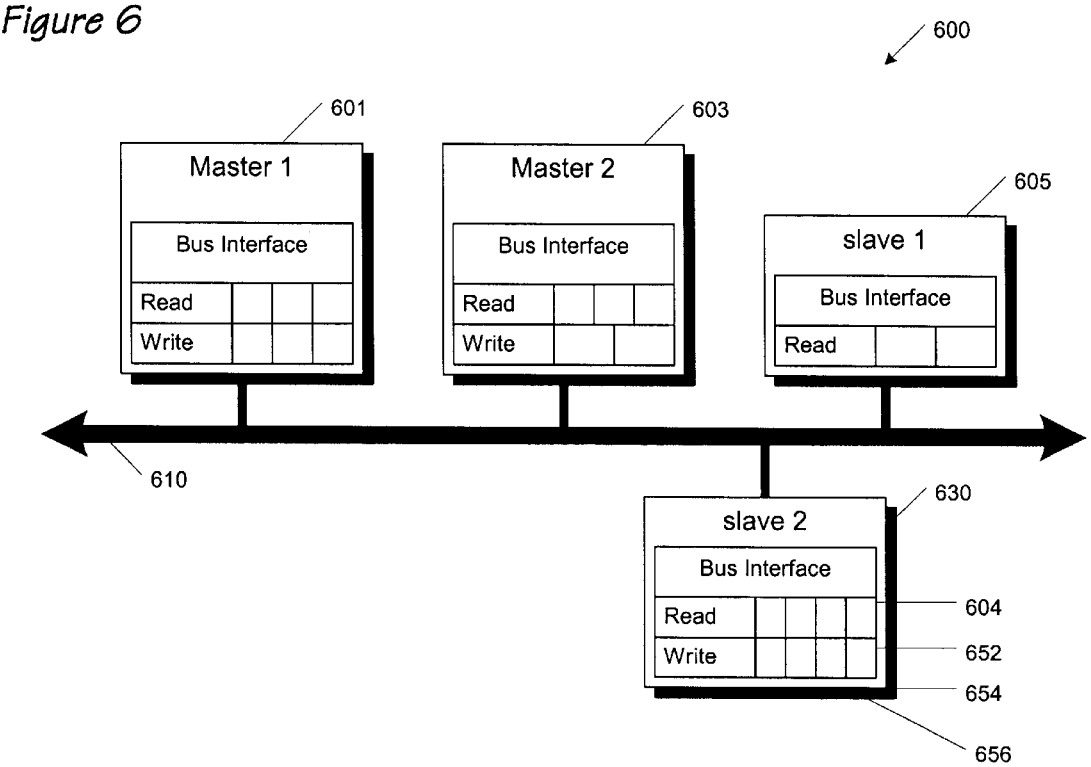

Figure 9A

| Source-Destination | Signal Name | Description |
|---|---|---|
| General (2 signals) | Bclk | Bus clock |
| | Breset | Bus reset |
| Master-Address Bus Arbiter (9 signals) | MAA_req | A dedicated reqest signal from every Master to the Address arbiter |
| | MAA_lock | When asserted with a request, this implies a request for two consecutive cycles on the address bus, one read and one write address |
| | MAA_slaveid[2:0] | Indicates to the arbiter the id of the target slave for the current request. Needed for pre-grant flow control |
| | MAA_type[1:0] | Indicates whether operation is read or write or neither. Needed for pre-grant flow control<br>00-Read (non-coherent)<br>01-Write (non-coherent)<br>10-Coherent<br>11-None of the above |
| | MAA_pri[1:0] | Two bits of priority that accompanies each request. The arbiter implementation can optionally use none, one, or both bits. When used, the priority levels are as follows:<br>00-level 1 (lowest priority)<br>01-level 2<br>10-level 3<br>11-level 4 (highest priority) |
| Slave-Address Bus Arbiter and Masters (2 signals per slave) | SAAM_rcredit | Read address credit signal from the Slave to the Address Bus Arbiter and all Masters, one per slave |
| | SAAM_wcredit | Write address credit signal from the Slave to the Address Bus Arbiter and all Masters, one per slave |
| Address Bus Arbiter - Master (1 signal) | AAM_gnt | The grant signal going from the arbiter to every Master |

Figure 9B

| Source-Destination | Signal Name | Description |
|---|---|---|
| Master-Data Bus Arbiter (3 signals) | MDA_req | Request signal from each Master to the data bus arbiter |
| | MDA_pri[1:0] | Two bits of priority that accompanies each request. The arbiter implementation can optionally use none, one, or both bits |
| Slave-Data Bus Arbiter (3 signals) | SDA_req | Slave request line to the data bus arbiter |
| | SDA_pri[1:0] | Priority of a Slave's request to the data bus arbiter |
| Data Bus Arbiter-Master (1 signal) | DAM_gnt | Grant signal going from the data bus arbiter to each Master. |
| Data Bus Arbiter-Slave (1 signal) | DAS_gnt | Grant signal to each slave |
| Address Bus (61 signals for a 32-bit data bus, 65 signals for a 64-bit data bus, 74 for a 128-bit data bus) | AB_addr[33:0] | The 34 bits of address |
| | AB_slaveid[2:0] | Whether this is explicitly needed depends on the decision to implement memory-mapped bus id's. |
| | AB_trid[7:0] | Three bits of Master id and 5 bits of transaction id used to uniquely identify 32 transactions from each Master |
| | AB_cmd[4:0] | The transaction type. e.g., coherent/non-coherent; exclusive/non-exclusive; read/write; data transfer/probe |
| | AB_priority[1:0] | The same priority sent to the address bus arbiter when requesting the bus for a read operation. These bits are ignored by the receiving slave on a write address operation |
| | AB_bytemask[3:0] or AB_bytemask[7:0] or AB_bytemask[15:0] | One bit per byte of data on the data bus. A lest than bus width transaction must be masked because bytemask implies lower address bits. When all the bits are 0, this implies a full bus width transaction. When any of the bytemask bits are 1, the zero bits indicate the position and size of the data associated with the transaction. When streaming data, the size and position of data per cycle is restricted to a few limited number of possible bytemasks: the full width of the bus, the lower 32 bits, or the lower 64 bits. |
| | AB_valid | A one-bit signal on the bus to indicate that the bus is being actively driven on a particular cycle or not |
| | AB_size[3:0] | specifies the size of the transaction, or burst size from 1-16 cycles, with values from 0-15 |

Figure 9C

| Source-Destination | Signal Name | Description |
|---|---|---|
| Data Bus (47 signals for a 32 bit bus, 79 signals for a 64 bit bus, or 151 signals for a 128 bit bus | DB_data[31:0] or DB_data [63:0] or DB_data{127:0] | The implementation allows a 32-bit, 64-bit or 128-bit wide data bus |
| | DB_trid[7:0] | The id of the transaction (returned by the Slave for a read data return) |
| | DB_order[3:0] | Specifies the order of data in the total 16 cycle count. This would be most commonly used to return critical data first for a cache line read |
| | DB_release | Used by a master on the bus to indicate that the bus has been released |
| | DB_endian | The endian-ness of the data on the bus. 0-little endian, 1-big endian |
| | DB_valid | A single bit signal on the bus to indicate that the bus is being actively drive on a particular cycle or not |
| Slaves (with caches) to the Memory Controller (7*2=14 signals, one per slave device) | COH_cstate[1:0] | The state of the cache line for the requested address 00-don't know yet 01-invalid 10-clean 11-dirty |
| Memory Controller to all Masters (1 signal) | COH_credit | When asserted, credits the coherency credit counters in all masters by one |

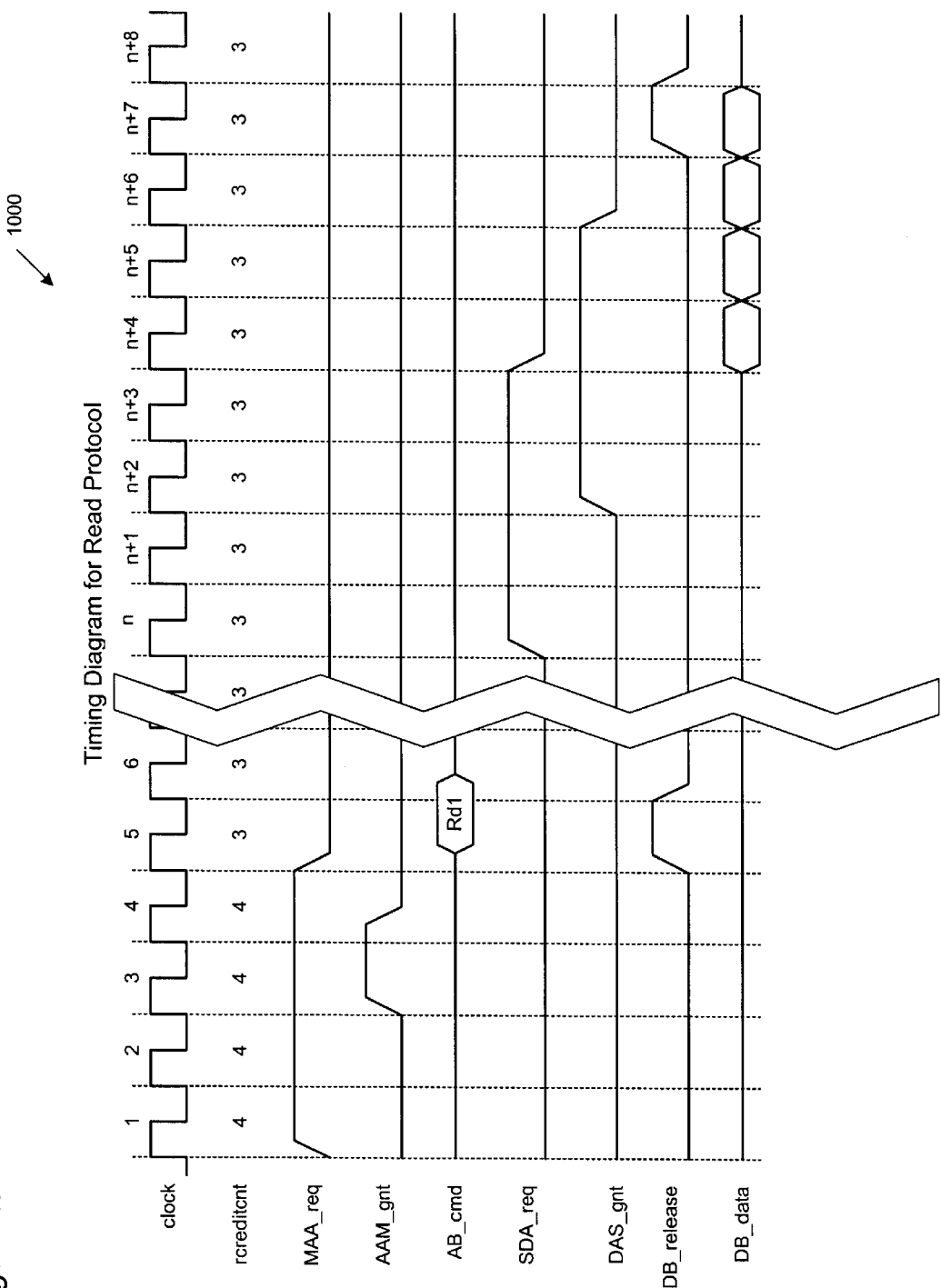

SCALABLE ON-CHIP SYSTEM BUS

CROSS REFERENCE TO RELATED APPLICATIONS

This application is related to the following U.S. patent applications, having a common filing date and a common assignee. Each of these applications is hereby incorporated by reference in its entirety for all purposes:

| Docket # | Title |
| --- | --- |
| MIPS:19427A-009300, U.S. Pat. Application Ser. No. 09/373,092. | LOCKED READ/WRITE ON SEPARATE ADDRESS/DATA BUS USING WRITE BARRIER |
| MIPS:19427A-009400, U.S. Pat. Application Ser. No. 09/373,094. | COHERENT DATA APPARATUS FOR AN ON-CHIP SPLIT TRANSACTION SYSTEM BUS |
| MIPS:19427A-009500, U.S. Pat. Application Ser. No. 09/373,093. | DATA RELEASE TO REDUCE LATENCY IN ON-CHIP SYSTEM BUS |
| MIPS:19427A-009600, U.S. Pat. Application Ser. No. 09/373,095. | BURST-CONFIGURABLE DATA BUS |

This invention relates in general to the field of computer architecture, and more specifically to an on-chip system bus to allow communication between multiple on-chip devices.

BACKGROUND OF THE INVENTION

A system bus in a computing system provides a communication channel between computing devices, such as microprocessors, and other devices such as memory, keyboard, monitor, video controllers, sound generation devices, etc. The system bus typically includes data paths for memory addresses, data, and control information. In some instances, a processor multiplexes (i.e., shares) address and data information over the same signal lines, albeit at different times. That is, a processor sends address information out over the address/data pins during a first time period and later uses the same address/data pins to send or receive data. Alternatively, many processors utilize separate signal lines for address and data information.

To better understand what a system bus is as well as the importance of bus interface standards, a general overview of the operation of a typical system bus is provided. Following that, a brief summary of modern system buses is given. Finally, an introduction to some of the needs that are not yet addressed by modern system buses is presented.

In operation, a microprocessor communicates with memory when it needs to fetch an instruction. During execution of that instruction, the microprocessor might be required to read data from memory, or from another external device such as an input/output (I/O) port. And, upon completion of the instruction, the microprocessor might be required to write data to memory, or to another external device. A typical scenario for accessing the memory to obtain the instruction and the data would be similar to the following:

1. The microprocessor presents a memory address for an instruction on the address lines of the system bus, and provides control information on the control lines of the system bus to indicate that the operation is a read.
2. In response to the address and control information being placed on the system bus, the memory places the instruction on the data lines of the system bus, which are then read by the microprocessor. The data is typically placed on the data lines N cycles after the address information has been placed on the address lines, where N is a positive integer and varies depending on the speed of the memory.
3. During execution of the instruction, if data is required, a memory address for the data is placed on the address lines of the system bus, and control information is placed on the control lines of the system bus to indicate a read.
4. Again, the memory places data corresponding to the memory address on the data lines of the system bus.
5. If the instruction needs to write to memory, the memory address for the write is placed on the address lines of the system bus, and control information is placed on the control lines to indicate a write.
6. N cycles after the memory address is presented, the data to be written is placed by the microprocessor on the data lines of the system bus. The memory uses the memory address presented in step 5, and places the data on the data lines into memory at that address.

One skilled in the art will appreciate from the above that the system bus provides the necessary physical interface between a computing device, and other devices (such as memory) that are external to it. The physical interface for a given system bus is typically defined in terms of the number of signal lines allocated to address, data, and control information, as well as the electrical characteristics of each of the signal lines. That is, typical system buses may provide anywhere from 20 address lines (for accessing up to 1 million different memory addresses), up to 32 address lines (for accessing up to 4 billion different memory addresses), or more. In addition, the size of the data portion of the system bus may vary from 8-bits in width, up to 128 bits in width, or more. One skilled in the art will also appreciate that the wider the data width, the more information can be transferred at the same time.

From an electrical standpoint, system buses typically operate in the range of 0 volts to 5 volts, although other ranges are possible. Furthermore, particular bus interfaces define for each signal line on the bus, what logical state is meant for a particular voltage level. For example, the bus interface defines whether a logical 1 is provided by a voltage level of 5 volts, 0 volts (active low), or something else.

A system bus interface also provides the protocol necessary for communicating between devices. That is, the protocol defines when address, data, and control signals must appear on the system bus, in relation to each other. For example, in the illustration presented above, address information appears in parallel with control information. At some time later, data information is presented by the microprocessor, or is provided by memory.

A system bus protocol may also define how long signals must appear on the system bus. For example, a system bus protocol might require that address information appear on the bus for at least 2 clock cycles. And, the protocol might require that data must appear on the bus later than 2 cycles after the address information is removed. One skilled in the art will appreciate that such protocol definitions are specific to particular types of system buses.

With the above general background on system buses, a brief overview will now be provided for modern system bus interfaces.

The most common system bus interface in the world today is the Industry Standard Architecture (ISA) bus. In 1984, with the introduction of the Intel 80286 microprocessor, a new bus was required that could utilize the full 16-bit data bus of that processor. IBM decided to develop a new bus interface that could accept the data width of the 80286, and allow them to add more address and control signals to the previously designed PC bus. However, to allow the bus to remain backward compatible with devices designed for the PC bus, compromises were made. The resultant ISA bus was therefore something of a hybrid, offering advantages of increased speed (8 megahertz), increased data lines (16-bit), and increased address lines (24-bit), as well as additional interrupt and control lines, while at the same time separating the additional lines on a supplementary connector. This allowed legacy expansion cards with 8-bit data interface to be used, while adding additional data and address pins on the supplementary connector. The result was an 8-MHz bus clock, with a 16-bit data path, and 24 address lines to address 16 megabytes of memory. However, the number of I/O ports was still limited to 1,024 due to compatibility concerns with PC bus expansion boards.

As processor speeds increased, Intel separated the processor from the ISA bus to allow faster communication between the processor and memory, while still providing communication with slower ISA devices. The processor bus that is presently offered is referred to as either the host bus, or the Pentium bus. A typical implementation of the Pentium bus provides address, data and control signals between a processor and a memory controller, and operates at approximately 100 MHz. Also attached to this host bus is a chip, or chip-set that provides an interface between the host bus, and slower buses such as PCI and ISA. For a more thorough discussion of various PC bus architectures, the reader is directed to http://www.pcguide.com/ref/mbsys/buses/index.htm.

In each of the above-mentioned buses, the protocol associted with performing a read or write is essentially the same. That is, a processor first places address and control information on the host bus. At some later time, data is presented on the data lines of the bus, either by the processor (if the transaction is a write), or by memory (if the transaction is a read). In environments where there is only 1 device capable of initiating bus activity (a uni-master environment), such a protocol is generally sufficient. However, in environments where multiple processors compete for access to shared devices, arbitration is needed to assign time on the bus to the multiple processors.

For example, if there are two processors on a host bus, both competing for access to memory, typical systems provide an arbitration protocol between the devices to establish which one has the right to begin. On the Pentium bus, a processor requests access to the bus by asserting a "bus request" signal. If the processor receives a "grant" signal either from another processor, or from an external arbitration device, then it begins a transaction by placing address and control information on the bus. When it receives (or writes) data on the bus, it relinquishes control of the bus to the next processor. If another processor required access to the bus during the transaction, it would have to wait until the entire transaction (including the address and data portions of the transaction) completed. In many situations, it is undesirable to deny a processor access to a bus pending completion of an entire transaction by another processor.

One solution to this problem has been to separate the address and data bus portions of the system bus, and to provide separate arbitration for gaining access to each of the buses. For example, rather than requesting access (or master) of the system bus, a first processor may request access to the address bus. If the address bus is available, the first processor can present address information on the address lines, even though a second processor is bus master of the data bus. Access to the data bus by the first processor operates in a similar fashion.

Thus, by separating arbitration for accessing the address bus from that of the data bus, multiple masters are allowed to utilize portions of the system bus simultaneously. An example of an environment that provides for such split address and data buses is the system bus for the PowerPC 603, manufactured by Motorola.

One skilled in the art should appreciate that when the address and data portions of a bus are separate, and are shared by multiple bus masters, a system must be developed for associating a data transaction with an address transaction. That is, if the address and data buses are truly separate, data may appear on the data bus many clock cycles after the address information was presented. In fact, in buses having split transactions, it is possible for two or more masters to present address information on the address bus long before data appears in response to the first address. In such an environment, it is essential to associate data on the data bus with either its associated address, or with a particular transaction.

In one environment, a transaction ID has been developed to tag all requests with a particular ID. When any data is presented on the data bus, the ID associated with the transaction is also placed on the data bus. This allows any processor on the bus to know whether the data being presented is associated with one of its outstanding transactions, and if so, which one. An example of using transaction ID's to track multiple transactions in a split address/data bus environment is the R10000 microprocessor developed by Silicon Graphics, Inc. (now known as "SGI").

Each of the above-described buses utilizes a protocol that establishes communication between a processor, and devices that are external to it. However, with modern improvements in fabrication technology, it is now possible to place some of the devices that have heretofore been external to the processor, on the same piece of silicon as the processor. This is most commonly seen in the embedded microprocessor world where devices such as SRAM, memory control, serial connectivity, etc., are fabricated on the same silicon as the processing device. However, in such embedded processors, the communication between the processing device, and the other devices on the chip, is typically accomplished via a proprietary interface between the processing device and those devices. That is, the interface between the devices and the core processor is specific to a particular implementation, rather than a universal interface for which other devices may be designed. As more and more devices are being incorporated onto the same silicon, it is becoming important to develop a scalable on-chip interface to allow communication between the different on-chip devices.

The above provides a general understanding of the progression of system buses, from multiplexed address/data lines in a single master environment, to on-chip proprietary interfaces. However, existing on-chip buses are designed for low-end systems that do not have high performance needs. In addition, the existing on-chip buses are not scalable.

Therefore, what is needed is an on-chip system bus interface that prescribes a uniform protocol for allowing computing devices to be designed, whether they are in a single master or multi-master environment. That is, the system bus interface must be scalable, to support low-bandwidth single processor solutions, to high-bandwidth multiple processor solutions.

Further, what is needed is an on-chip system bus interface that is flexible. That is, a system bus is needed that simultaneously supports multiple devices having varying bandwidth requirements. The system bus must be capable of supporting both real-time and non-real-time data demands.

Moreover, since on-chip embedded systems tend to span a wide range of complexity, from low-end solutions such as a cell phone, to high-end solutions such as a set-top box, the bus interface must enable different implementations of varying complexity.

SUMMARY

The present invention provides an innovative on-chip system bus and bus interface that separates the address and data portions of transactions on a split transaction bus. By separating the address and data portions of a transaction and presenting them on separate buses, multiple transactions, by either a single master, or multiple masters, can exist concurrently, without requiring that a first transaction be completed before beginning a second transaction. Such separation of transactions on a split transaction bus also allows for out-of-order completion of transactions.

In an embodiment of the present invention, an on-chip system bus includes a bus interface for interfacing a master device to a slave via the system bus. The master device includes split transaction tracking and control, and flow control logic. The split transaction tracking and control establishes transaction ID's for transactions to be present ed on the system bus where the transactions have split address and data portions. The transaction ID's have master device ID's and transaction tags for uniquely identifying all pending transactions on the system bus. The transaction ID's are presented on the system bus commensurate with presentation of an address. Devices responding with data provide the associated transaction ID along with the data. The flow control logic determines whether devices that are being read from, or written to, by transactions, have adequate resources (buffers) to respond to the transactions. If the flow control logic determines that adequate resources are available, the transactions are presented to the system bus. If the flow control logic determines that adequate resources are not available, the transactions are held until the resources become available. By providing such flow control, there is no need to retry any transactions resulting from inadequate resources.

In another aspect, the present invention provides a computer program product on a computer useable medium. Within the medium are a first computer readable program code and a second computer readable program code. The first code provides split transaction tracking and control to establish transaction ID's for transactions to be presented on an on-chip system bus having address and data buses. The second code provides flow control logic to determine whether devices being read from, or written to, by the transactions, have buffers currently available to respond to the transactions.

Other features and advantages of the present invention will become apparent upon study of the remaining portions of the specification and drawings.

BRIEF DESCRIPTION OF THE DRAWINGS

FIG. 5 is a timing diagram illustrating use of the split transaction tracking and control on the on-chip system bus of the present invention.

FIG. 6 is a block diagram of a multi-master process or architecture that includes differing read/write queue structures according to the present invention.

FIGS. 9A–9C contain a table illustrating the address, data, and control lines of the system bus according to the present invention.

FIG. 10 is a timing diagram illustrating the read protocol of the split-transaction on-chip system bus according to the present invention.

DETAILED DESCRIPTION

The above background provided an overview of system buses, and described a few of the problems in contemporary bus interfaces. The discussion below provides a more detailed overview of a related art system bus, in FIGS. 1 and 2, so that the reader will better understand the novel features of the present invention described with reference to FIGS. 3–11.

Figure 1:
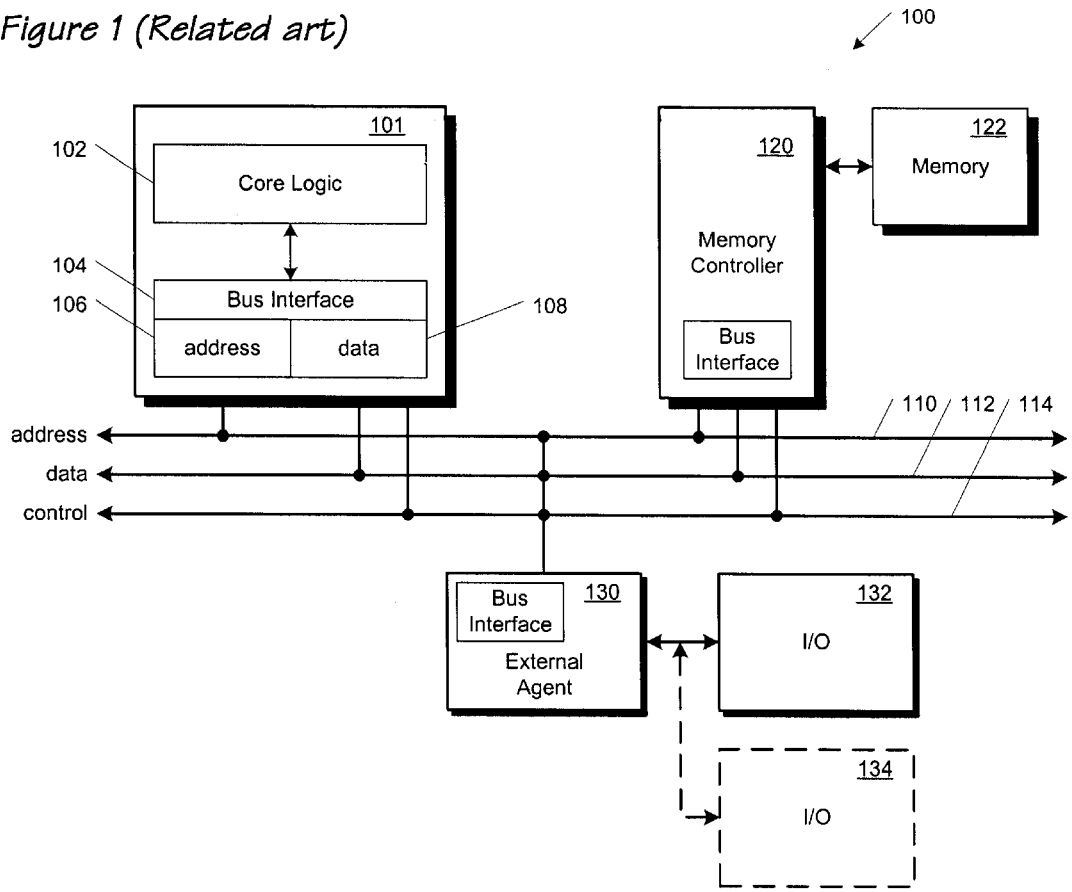
FIG. 1 is a block diagram of a related art computer network illustrating a processor connected through a bus interface to a memory controller, and other devices.

Referring to FIG. 1, a block diagram 100 of a related art computer system is shown. The computer system 100 includes a microprocessor 101 coupled to a memory 122 via a memory controller 120, via a system bus having separate address lines 110, data lines 112, and control lines 114. Also coupled to the system bus is an external agent 130 connected to I/O devices 132, 134. The external agent 130 is what is typically referred to as the "chip-set". It provides an interface between the system bus, and downstream buses to which the I/O devices 132, 134 are connected.

One skilled in the art will appreciate that the system bus of FIG. 1 may be either an on-chip or off-chip system bus depending on the solution required. In addition, the system bus as shown presents each device coupled directly to each of the address/data/control buses 110, 112, 114. The illustration of FIG. 1 is exemplary only. One skilled in the art understands that the separate buses 110, 112, 114 may connect to distinct devices, in a point-to-point fashion. The structure of the system bus in FIG. 1 simply provides a convenient illustration of how distinct devices communicate with one another over address/data/control lines. One skilled in the art will appreciate that the physical implementation of the lines may vary from one chip implementation to another.

Within the microprocessor 101 is a bus interface 104 with separate address 106 and data 108 portions, for interfacing the microprocessor 101 to the address and data lines 110, 112 of the system bus. The bus interface 104 is coupled to core logic 102 for executing instructions retrieved by the microprocessor 101.

In operation, when the microprocessor 101 wishes to communicate with an external device, such as the memory 120, or the I/O 132, the bus interface 104 is required to perform a bus cycle using the address, data, and control lines 110–114. During a bus cycle, the microprocessor 101 places an address corresponding to the target memory (or I/O) address on the address lines 110. In addition, the microprocessor 101 indicates the type of bus cycle it is initiating by placing a pattern on the control lines 114. Exemplary bus cycle types include reads and writes to memory or I/O. If the bus cycle type is a read, then N cycles after the memory 120 sees the target address on the address lines 110, and notices the bus cycle type from the control lines 114, the memory 120 will place the data stored at the target address on the data lines 112. The data portion 108 of the bus interface 104 will see the data on the data lines 112 and will latch the data for use by the core logic 102.

Figure 2:
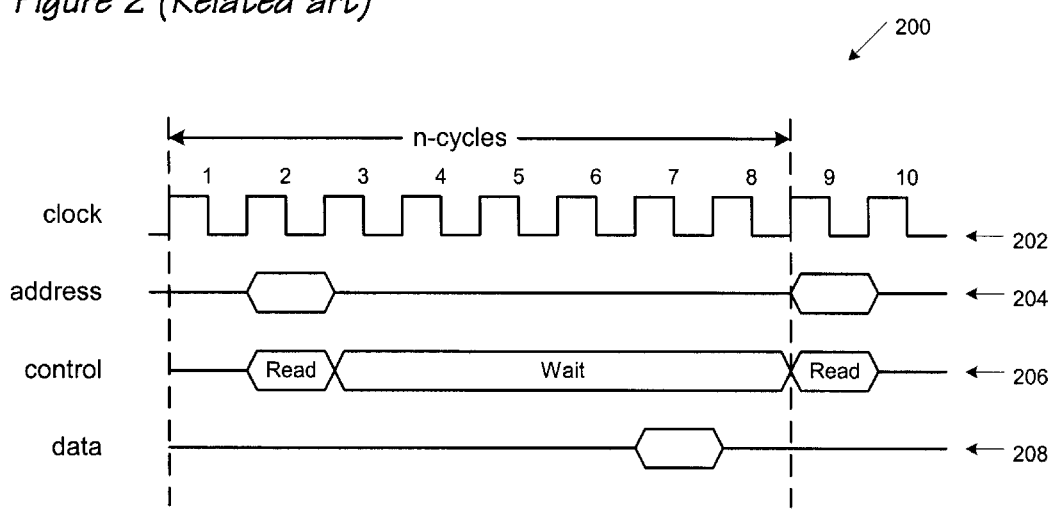
FIG. 2 is related art timing diagram illustrating a memory read cycle through the bus interface of FIG. 1.

This is particularly illustrated in FIG. 2 to which attention is now directed. FIG. 2 provides a timing diagram 200 that illustrates a memory read bus cycle for the computing system 100 described above. A clock 202 is shown that is the clock for the system bus. Addresses on address lines 110 are shown as an address signal 204. Data on data lines 112 are shown as data signal 208. Control information on control lines 114 is shown as command signal 206.

In performing a memory read, the processor 101 asserts a target address signal 204 on address lines 110 during clock cycle 2. The processor 101 also asserts control signal 206 indicating a memory read operation on control lines 114 during clock cycle 2. The memory 120 recognizes the target address signal 204 and the control signal 206, and retrieves data from the target address. The memory 120 places the data on the data lines 112 during clock cycle 7. The data portion 108 of the bus interface 104 latches the data during clock cycle 7 for use by the processor 101.

What should be apparent from the timing diagram 200 is that 6 clock cycles have been required for the microprocessor 101 to retrieve data from the memory 120. Thus, from clock cycle 2 until clock cycle 8, the system bus is busy servicing the memory read operation for processor 101. If the processor 101 requires another memory read (or any other bus operation), it must wait until clock cycle 9 before it can begin. In addition, if a second processor (not shown) is attached to the system bus, it would also need to wait until the first memory read operation completes. One skilled in the art will appreciate that requiring a processing device in a computing environment to wait or stall execution pending access to the system bus, slows down the processing of the computing environment, and is highly undesirable. What will now be described with reference to FIGS. 3–13 is a bus interface directed at overcoming waits or stalls associated with the sharing of a system bus by one or more processing devices.

Overview of the OCS Bus

The discussion below describes novel aspects of the present invention as embodied within an On-Chip System (OCS) Bus. The OCS Bus is a scalable split-transaction bus for interfacing multiple masters in an on-chip environment.

The OCS Bus provides a synchronous interface to a de-multiplexed split transaction bus, having a 36-bit address bus, 4 to 16 bits of byte mask depending on the size of the data bus, and either a 32, 64 or 128-bit data bus. The arbitration for the address and data buses is independent, with the arbiter being central (one per bus). The arbiter considers all the incoming bus requests and decides a winner based upon the implemented algorithm. In the simplest instance, the arbiter does round robin scheduling of all the requesting masters. The complexity of the arbitration algorithm can vary depending on the performance requirements of the system. The buses and arbiter logic are pipelined, so the arbiter can be granting the bus to the next requester, while the previous winner is using the bus.

The data portion of the OCS bus supports burst transactions for devices with bursting traffic or higher bandwidth requirements. The address bus inherently only supports single cycle transactions, with the exception of locked read-modify-write operations. The protocol also allows the last-use master to park on the bus, for both buses, while there are no other requesters.

Although the description below will illustrate a particular embodiment of the OCS Bus, one skilled in the art will appreciate that the novel aspects of the present invention are applicable to other bus designs, and should not be restricted to the particular embodiment described.

Figure 3:
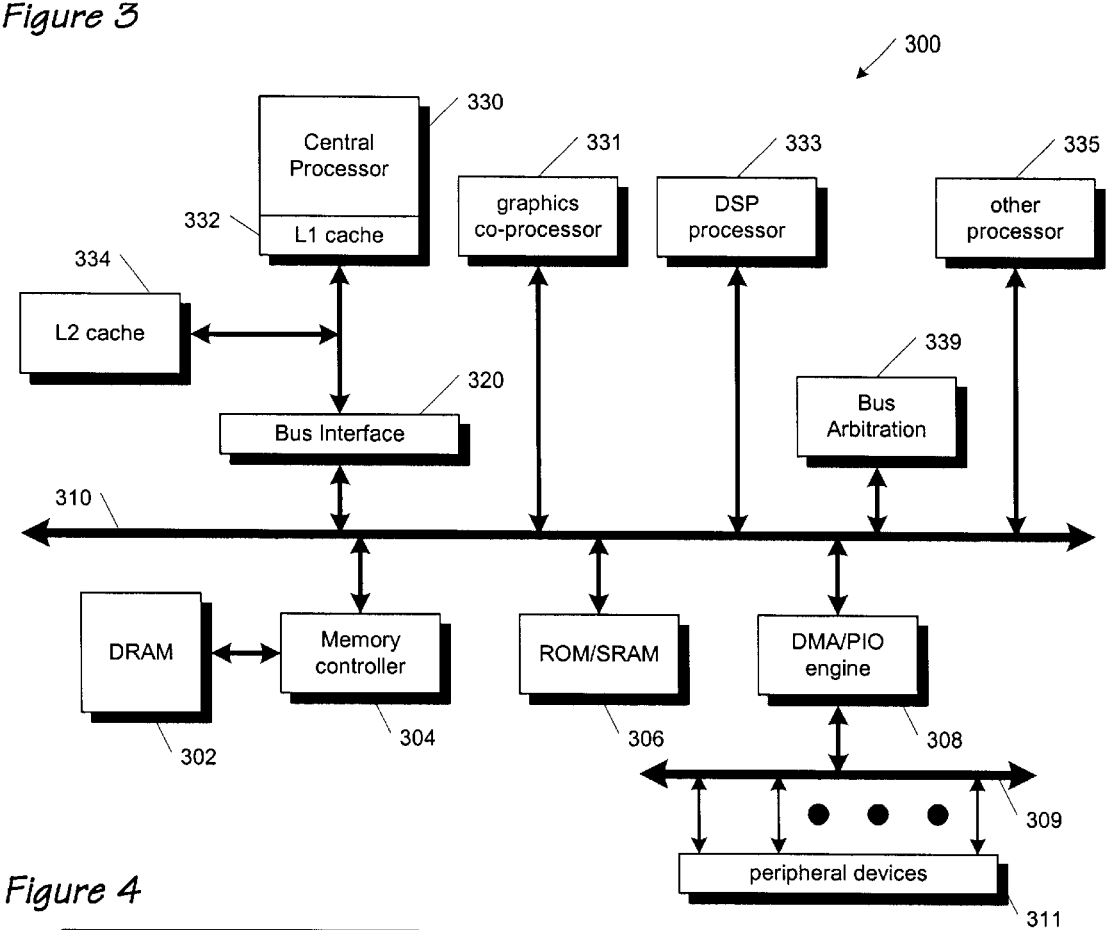
FIG. 3 is a block diagram of an on-chip system bus according to the present invention, particularly illustrating a multiple master/slave environment.

Referring to FIG. 3, a block diagram 300 is provided illustrating a number of on-chip processing devices in communication with each other via a system bus 310. More specifically, a central processor 330 (having an L1 cache 332) is coupled to the system bus 310 via a bus interface 320. Between the bus interface 320 and the central processor 330 is an L2 cache 334. To illustrate that the on-chip system bus 310 is a multi-master bus, other master devices are shown including: a graphics co-processor 331, a DSP processor 333, and an other processor 335. Furthermore, a number of slave devices are shown attached to the system bus 310 including: DRAM 302 attached via a memory controller 304; ROM/SRAM 306; and a direct memory access (DMA)/programmable input output (PIO) engine 308 for coupling peripheral I/O devices 311 to the system bus 310 via a peripheral bus 309.

Operationally, any of the master devices 330, 331, 333, 335 can communicate with the memory controller 304, ROM/SRAM 306 or the DMA/PIO engine 308 via the system bus 310, albeit at different times. In addition, the master devices 330, 331, 333, and 335 may have resources within them that may be accessed by the other master devices. That is, a device may be a master device for some transactions and a slave device for other transactions.

Finally, coupled to the system bus 310 is bus arbitration logic 339. The bus arbitration logic is responsible for receiving bus master requests for either the address bus or the data bus, and for providing bus grant signals to the requesters according to a predetermined arbitration algorithm. The protocol for requesting mastership of the address and data buses will be further described below. First however, a detailed description will be provided for the split-transaction logic, and the flow control logic, that are embodied within the on-chip OCS bus, according to the present invention.

Split Transactions

The computing environment described above in FIG. 1 required the processor 101 to wait until the data portion of the bus cycle completed before it was allowed to issue another read request. To eliminate this wait, the system bus 310 of the present invention provides a split transaction bus. That is, the master devices do not have to wait for a request to be completed before issuing a new request. Rather, the masters, on the address/control lines of the system bus 310, are allowed to make requests before the data portions associated with their requests complete. In addition, the masters receive and process requests even when they are waiting on completion of prior requests. This is accomplished by separating the request and the reply portions of transactions. By de-coupling the request portion of a transaction, from the reply portion of the transaction, latencies typically associated with waiting on the reply portion to complete are eliminated.

However, since multiple requests can be pending on the system bus 310 at any one time, a means is required to identify data replies back to their corresponding requests, if out-of-order returns are to be permitted. To satisfy this requirement a master tags each request that is made on the system bus 310 when it issues. When a data response is ready, a slave device sends the tag back to the requesting master with the data. For Write requests, the writing master sends the written data with the same tag it used when it issued the Write control. Furthermore if multiple masters are placed on the system bus 310, a portion of the tag is used to identify the requesting device.

Figure 4:
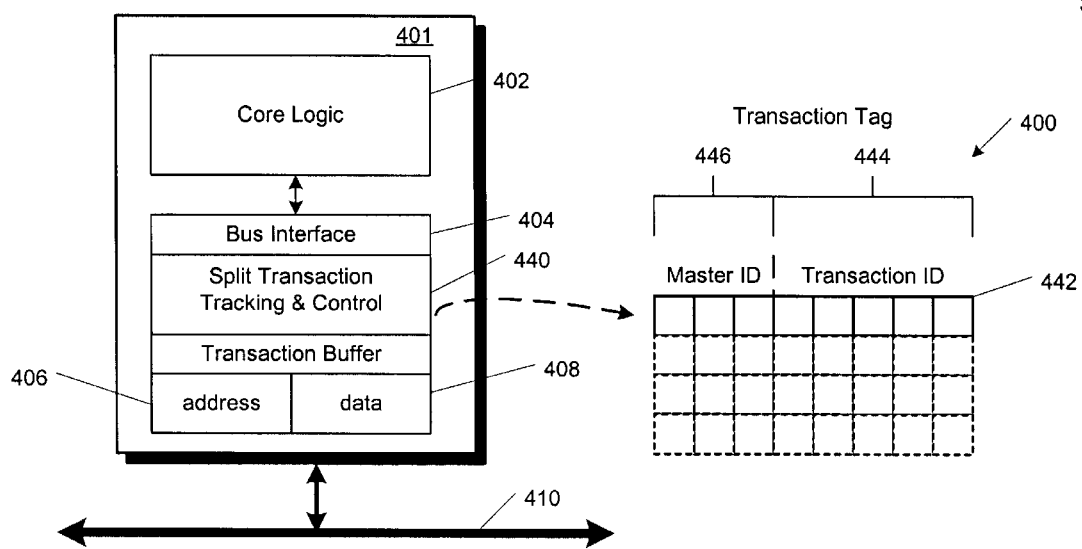
FIG. 4 is a block diagram of a processing device incorporating split transaction tracking and control for interfacing to the on-chip system bus.

Referring to FIG. 4, a block diagram 400 is provided of a microprocessor 401 incorporating aspects of the present invention. Elements similar to those described in FIG. 1 above are shown with the same reference numbers, the hundreds digit being replaced with a 4.

Additionally, the processor 401 includes split transaction tracking & control 440 coupled to the core logic 402 and the bus interface 404. In one environment, the split transaction tracking and control 440 is embodied within the bus interface 404 within the processor 401, although this is not a requirement. Within the split transaction logic 440 is at least one transaction buffer 442. The transaction buffer 442 provides temporary storage for transactions until they complete. The transaction tags are 8-bits in width, for storing a 5-bit transaction ID 444 and a 3-bit master device ID 446. By using a 5-bit transaction ID 444, as many as 32 outstanding requests may exist on the system bus 410, that is, a 32 entry transaction buffer. In addition, by using a 3-bit master device ID 446, as many as 8 different master devices may initiate transactions. If an implementation requires tracking of all 32 requests, the transaction buffer 442 may be implemented with a 32 entry table (i.e., one entry per outstanding transaction).

In operation, as each request is made by the processor 401, a target address is placed on address lines of the system bus 410. Note: particular definitions of each of the lines on the system bus 410 are provided below with reference to FIG. 9.

In addition, as part of the request, the split transaction tracking and control 440 provides a transaction ID that is associated with the request. The transaction ID is then placed on the ID control lines (described further below)l of the system bus 410. In one embodiment, the split transaction tracking & control 440 generates a transaction id based on an index into a 32-entry transaction buffer 442. The index of a free entry in this buffer 442 (i.e., the lowest numbered free entry) is the generated transaction id. Information related to the transaction is stored in this buffer until the request is returned from the slave device.

When a reply is presented on the data lines of the system bus 410, the transaction ID associated with the request is placed on the data ID lines of the system bus 410. Thus, the device replying to the request must be designed to provide the transaction ID to the system bus 410 along with the data. To better understand how splitting the request and reply portions of a bus cycle reduces the wait described above, attention is directed to FIG. 5.

In FIG. 5, a timing diagram 500 is provided illustrating split transaction requests/replies. During clock cycle 1, request 1 is placed on the control lines of the system bus 410 to indicate a read. In addition, the split transaction tracking & control 440 places a transaction ID of 1 together with the id of the master (e.g., 0) on the ID lines of the system bus 410. At the same time, the address portion 406 of the bus interface 404 places the target address associated with the request on the address lines of the system bus 410. At the end of clock cycle 1, the address and control lines of the system bus 410 are free to perform another transaction. This is true even though the reply associated with request 1 has not completed. Thus, in comparison with FIG. 2, the processor does not have to wait 6–8 cycles before beginning another request. Rather, the processor 401 can immediately make an other request, if needed.

As shown in FIG. 5, the processor 401 makes 3 back to back requests. Beginning in clock cycle 2, the processor 401 issues request 2 on the control lines of the system bus 410. In addition, the split transaction tracking & control 440 provides a transaction ID of 2 to the bus interface, which is presented on the ID lines of the system bus 410. At the end of clock cycle 2, the address and control lines are free to perform another request.

So, in clock cycle 3, the processor 401 issues request 3 on the control lines of the system bus 410. The split transaction and control 440 provides a transaction ID of 3 to be presented on the ID lines of the system bus 410. The target address associated with request 3 is also presented on the address lines of the system bus 410. At the end of clock cycle 3, the address and control lines are free to perform another transaction.

During clock cycle 6, data associated with request 1 is placed on the data lines of the system bus 410. The data is being provided by memory external to the processor 401, or by the slave device that is indicated by the device ID lines of the transaction tag. In addition, the transaction ID associated with request 1 is placed on the data ID lines of the system bus 410 to identify the data with its associated transaction. At this point, the bus interface 404 of the processor 401 detects the data, and its associated transaction ID. Since the transaction ID indicates the requesting master device ID, the processor 401 knows that it is the requester. So, the processor 401 latches the data in the data portion 408 of the bus interface 404. The transaction tag is then provided to the split transaction & control 440. The split transaction & control 440 is then responsible for associating the data according to the target address of request 1. At the end of clock cycle 6, the data lines are free to be used by another device on the OCS bus 410.

During clock cycle 8, data associated with request 2 is placed on the data lines of the system bus. Again, along with the data, its associated transaction tag is placed on the ID lines of the system bus. The processor recognizes that it was the requester of the data, and latches the data in the data portion 408 of the bus interface 404. The split transaction & control 440 is then responsible for associating the data according to the target address of request 2.

What has been described above with respect to FIGS. 4 and 5 is a means for separating the request and reply portions of a bus cycle to allow multiple requests to be made, without regard to latencies associated with replies. In the embodiment shown, all of the concurrent requests were memory read requests (as opposed to memory writes, or I/O reads/ writes) However, one skilled in the art will appreciate that the nature of the request does not affect the advantages of the split transaction bus. In addition, what has been described are concurrent requests made by a single processor 401. It should also be appreciated that multiple processors can exist on the system bus 410 each having their own device ID.

Credit/Debit Flow Control

Using a split transaction protocol such as the one described above, since multiple requests may be submitted to a device before it responds, it is possible that the recipient of the requests can become overloaded. That is, a receiving (or slave) device of transaction requests may not have the buffer space to deal with multiple transactions, or at least the number of transactions that are currently pending. When this occurs, the receiver does not receive the request, requiring the requester to retry the request. Causing a requester to retry a request delays processing of the request, and adds additional traffic on the bus. Therefore, to ensure that requests placed on the system bus can always be replied to by slave devices, a flow control mechanism has been incorporated into the system bus of the present invention. The flow control mechanism uses a distributed credit-based scheme. There are two counters provided for each slave in the system, one for the read address buffer, and one for the write address buffer. Before sending a request out on the address bus, a master must check the appropriate slave counter to ensure positive credit and that the slave can accept the transaction.

One skilled in the art understands that a device can be either a master (one that initiates requests), a slave (one that responds to requests), or a master/slave device (one that can initiate requests and respond to requests) A reference to a master device includes master as well as master/slave devices, and a reference to a slave device includes slave as well as master slave devices.

Referring to FIG. 6, a block diagram of a multi-master computing system 600 is shown. The system 600 includes master devices 601, 603, each of which may be master of the system bus 610. In addition, coupled to the system bus 610 are slave devices 605, and 630. In one embodiment, the slave 630 provides an interface between the system bus 610 and downstream buses, and controls arbitration over the system bus 610. While not specifically shown, it should be understood that the system bus 610 is a split transaction bus such as that described above.

Within each of the devices 601, 603, 605 and 630 is a bus interface 604 that controls the interaction between the devices and the system bus 610. In addition, each of the bus interfaces 604 may contain a read buffer portion 652, and a write buffer portion 654, each portion containing a plurality of individual buffers 656. The buffers 656 provide temporary storage for data coming into a device (read portion 652) or data being written out of a device (write portion 654).

What is particularly illustrated in the system 600 is that each of the devices 601, 603, 605, and 630 has different sizes and configurations of read/write buffers. For example, master/slave 601 contains 3 read buffers and 3 write buffers. Master/slave 603 contains 3 read buffers and 2 write buffers. Slave 605 contains 2 read buffers and 0 write buffers. Slave 630 contains 4 read buffers and 4 write buffers. In addition, while not shown, the size of the buffers in each of the devices may be different. That is, a read buffer in master 601 may be 64-bits wide. However, a read buffer in slave 605 may be only 32-bits wide.

As mentioned above, in a split transaction bus, it is important that a requesting device not place more requests on the system bus 610 than a replying device can handle. Therefore, to prevent a requesting device from overloading the capacity of a replying device, the present invention incorporates a credit/debit flow control mechanism into each requesting device. This is particularly illustrated in FIG. 7 to which attention is now directed.

Figure 7:
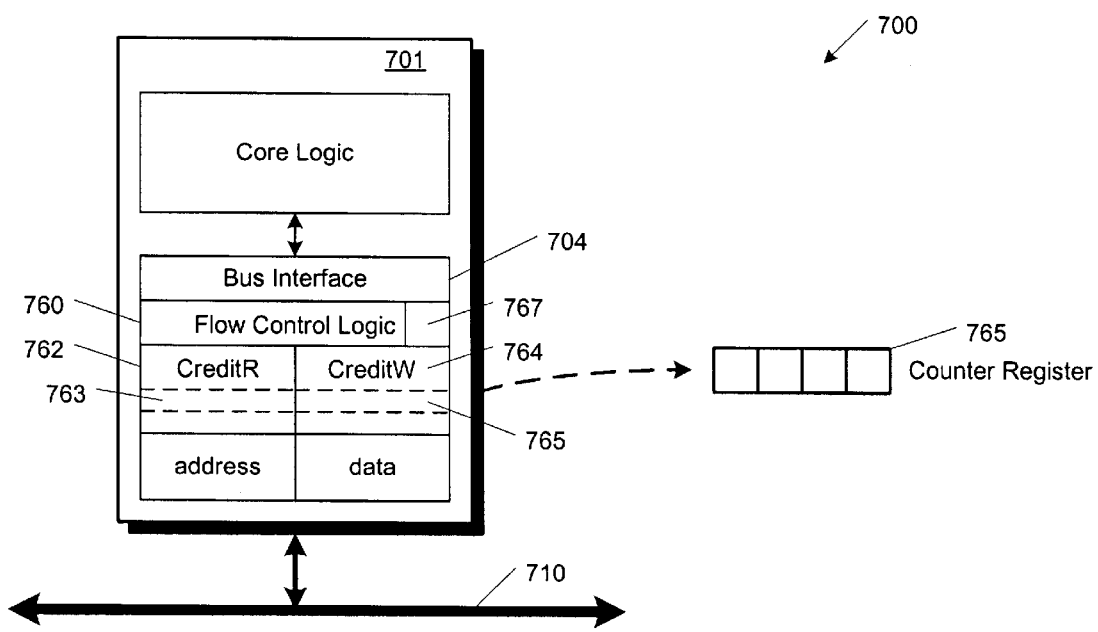
FIG. 7 is a block diagram of a microprocessor according to the present invention that contains credit based flow control counters for tracking the different queue structures illustrated in FIG. 5.

In FIG. 7, a block diagram 700 of a master device 701 is shown. The master 701 is similar to that shown in FIG. 3 with like elements having like references, the hundreds digit being replaced with a 7. In addition, the master 701 includes flow control logic 760 within the bus interface 704. Within the flow control logic 760 are a credit read portion 762 and a write portion 764. The credit read portion 762 contains a plurality of read credit counter registers 763. The credit write portion 764 contains a plurality of write credit counter registers 765. In one embodiment, the counter registers 763, 765 are 4-bit counters, capable of tracking 16 different read/write buffers per external device. The processor 701 is shown coupled to the system bus 710.

While not specifically shown, a counter register is provided within the flow control logic 760 of each requesting device 601, 603, 630, for tracking the number of request s made to each slave device, within a given system. For example, in a system that has only 1 slave device, the flow control logic 760 within each master device will have 1 read credit counter register 763, and 1 write credit counter register 765. However, in a system that has more than 2 slave devices, or additional slave devices, the flow control logic 760 within each master device will have additional read credit counter registers 763, and write credit counter registers 765, a pair per slave device. Of course, this illustration is exemplary only. One should be understood is that the flow control logic 760 within each requesting device must have means for tracking the number of read/write buffers available in each slave device.

Also, while not shown, some low-end slave devices may implement a single buffer for both read and write addresses. In such instances, the master must be programmed to know this. Thus, a 7-bit configuration register 767 is provided for each such slave to indicate whether or not the slave implements a unified buffer. The master 701 may then consult the register 767 when reading/writing to the slave, and can debit both counters 762, 765 for both read and write operations, and credit both counters 762, 765 when it sees a credit signal on either the read-credit or write-credit signal lines.

In operation, when the computing system 600 powers on, a protocol is established between the flow control logic 760 within each master, and each replying device, to allow the replying devices to communicate to the masters, their read/write buffer configuration. In one embodiment, each replying device presents a signal on its read and write credit lines that are connected to the master devices. Within a given time period, each time a replying device toggles either of the credit lines, its associated counter register in each master device is incremented. For example, if a slave device toggles its read credit line 4 times, then the read credit counter register 763 (associated with that slave) in each master device will increment to 4. Use of the credit read/write counter registers by the masters is then used to control whether requests are made to the replying device, in the manner described below with reference to FIG. 8.

Figure 8:
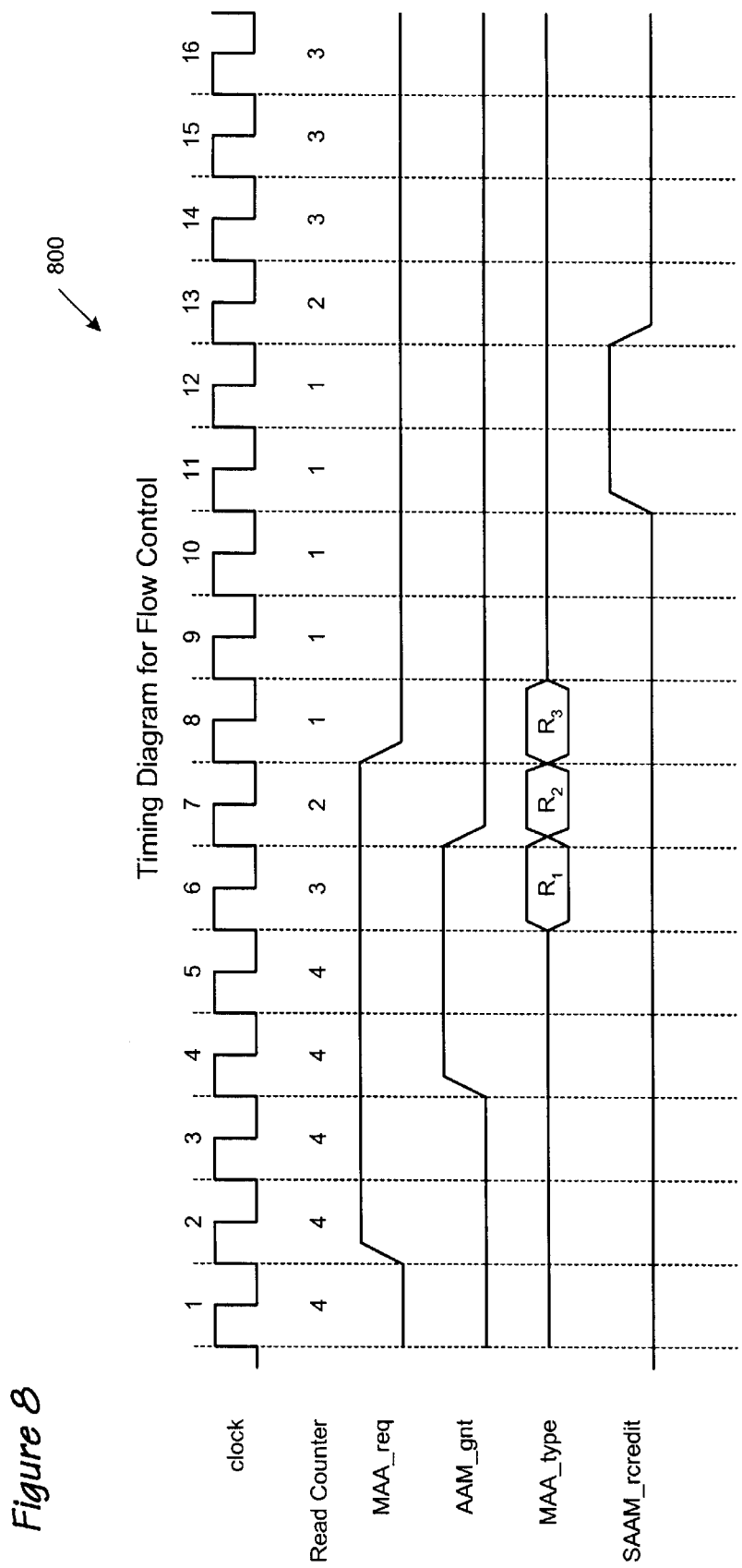
FIG. 8 is a timing diagram illustrating the credit based flow control mechanism of FIG. 6.

Referring now to FIG. 8, a timing diagram 800 is shown that illustrates the flow control mechanism of the present invention. The diagram 800 presents the following control signals: MAA_req; AAM_gnt; MAA_type; and SAAM_rcredit. Each of these control signals are part of the OCS bus of the present invention. The signals associated with the address and data portions of the illustrated bus cycles have been removed for simplicity. In addition, the signals shown are illustrated as active HIGH. One skilled in the art will appreciate than all or some of the signals may be implemented as active LOW.

In addition, a Read count is shown below each clock cycle to illustrate the number of read buffers available within a replying device, as recorded in a credit read count register of the requesting master. As mentioned above, the read credit counter register is initialized by a replying device after power up.

During clock cycle 1, the read credit counter register that is associated with the device to which the request is directed, contains the number 4. This indicates that the slave device has 4 available read buffers. Therefore, before making the request for the address bus, the master knows that it can make up to 4 read requests of this slave device.

During clock cycle 2, a master asserts MAA_req to indicate that it wishes to become master of the address bus, and provide a request.

During clock cycle 3, no activity occurs on the bus. In one embodiment, the bus of the present invention utilizes a fully registered interface. This implies that system interface outputs are driven on the rising edge of the system clock. Inputs are also sampled on the rising edge of the system clock. When a master asserts MAA_req during clock cycle 2, the signal will not be sampled by the arbiter until clock cycle 3. The arbiter can then respond during the following clock cycle (cycle 4). The master will see the grant during clock cycle 5, and can begin driving the address bus during clock cycle 6. Thus, a 2 cycle latency is presumed between request and grant, and between grant and the requester becoming master, for the registered interface. One skilled in the art will appreciate that alternative interfaces may be utilized, depending on the solution desired.

During clock cycle 4, the arbiter drives an AAM_gnt signal. In one embodiment, a master can begin driving the address bus 2 cycles after it receives grant. So, in clock cycle 6, the master presents a first read request on the control lines of the bus, indicated by $R_1$ on the MAA_type lines. While not shown, it should be appreciated that the target address for the read is presented on the address line at the same time. Also, when the master issues a read request, the flow control logic 760 within the master decrements the read credit counter register 763 associated with the target slave. In the present illustration, the counter is decremented from 4 to 3. In addition, all other masters on the bus decrement their read credit counter registers for that target slave when they see the actual read request on the bus, at cycle 6.

During clock cycle 5, since AAM_gnt is still being driven to the master, indicating that no other device requires access to the address lines of the OCS bus, the master can issue a second read request $R_2$ on the control lines of the bus. Since it requires more data from the replying device, it issues the request. In addition, the flow control logic 760 within the master decrements the read credit counter register 763 from 3 to 2 (in clock cycle 7).

During clock cycle 6, since AAM_gnt is still being driven to the master, and since the master still requires more data, the master issues a third read request R3 on the control lines of the bus. In addition, the flow control logic 760 within the master decrements the read credit counter register 763 from 2 to 1 (in clock cycle 8).

What has been described thus far is how a single master tracks the number of available read buffers for a single replying device. However, what should be appreciated is that if there are multiple masters attached to the OCS bus, each of the masters must track the number of available buffers in the slave devices. While the master performing the request has advance notice of a request being made, and can decrement its counter commensurate with the request, other masters are required to see a request being made, and decrement their counters corresponding to the number of requests made. In one embodiment, master devices on the OCS bus require 2 clock cycles after seeing a request, to decrement their counters.

During clock cycle 11, the slave device to which the initial request was made drives the SAAM_rcredit line to indicate that it has cleared one of its buffers that was being utilized by a previous request. In one embodiment, it takes the master 701 two cycles after seeing a SAAM_rcredit to increment its read credit counter register from 1 to 2, which it does, as is illustrated in clock cycle 13. While not shown, it should be appreciated that all masters on the OCS bus will also increment their associated read credit counters after seeing SAAM_rcredit.

During clock cycle 12, the slave device continues to drive SAAM_rcredit indicating that it has cleared another one of its buffers that was utilized by a previous request. Thus, in clock cycle 14, it increments its read credit counter from 2 to 3. At the end of clock cycle 12, the slave device ceases driving SAAM_rcredit.

During clock cycle 13, since the SAAM_rcredit line is no longer being driven, no other credit read count registers are incremented.

At this point, what is important to understand, is that at any time, every master knows whether it can issue a request (whether a read or a write, to memory or I/O) to a particular device, knowing that the device is capable of responding. This is very important on a split transaction bus where requests and replies are separated, and where replies can be provided out of order. And, by tracking the number of free resources on a transaction by transaction basis, the need for retrying bus cycles is eliminated.

While not specifically illustrated in FIG. 8, it should be appreciated that the write credit counter register 765 works similarly to the read credit counter register 763, only for writes. Furthermore, the control signal SAAM_wcredit is used by a slave device to indicate to the processor 701 that it has cleared a write buffer. Finally, since the processor 701 may contain read/write buffers that are used by another master, it can provide one or more read/write credit signals to indicate when its buffers are cleared.

OCS Bus Interface Signals

Referring to FIG. 9, a table 900 is shown that illustrates Address, Data and Control signals according to the OCS bus of the present invention. This Figure shows: 17 signal lines for address bus arbitration (plus 2 credit/debit signals per slave); 8 signal lines for data bus arbitration (plus additional signals for each master in a system); 52–65 address bus signals (depending on the size of the data bus); 47–151 signals for data bus signals (depending on the size of the data bus); and 3 signal lines for coherency.

The OCS bus interface 704 illustrated in table 900 is partitioned into three sub-interfaces, each of which operates independently from the others. The OCS bus interface 704 consists of separately controlled Address, Data and Coherence interfaces. The address and the data interfaces are independent, and each can be in either a master or slave state at any time regardless of the state of the other.

In address master state, the master drives the bi-directional address interface signals and is permitted to issue master requests to the OCS bus. In slave state, the master does not drive the bi-directional address interface signals and accepts external requests from the OCS bus.

In data master state, the master drives the bi-directional data interface signals and is permitted to send write-back, store or response data to the OCS bus. In slave state, the master does not drive the bi-directional data interface signals and accepts data responses from the OCS bus.

The coherence interface does not have any bi-directional signals. It is always in master state and driven by the master.

Address Bus Protocol

When a master wants to use the address bus, it sends a request signal to the address bus arbiter. The arbiter grants the bus based on its arbitration algorithm. The master asserts the lock signal when it wants the address bus for two consecutive cycles (r-w). Besides these, the master's bus interface sends three other pieces of information to the address bus arbiter: the transaction type MAA_type[1:01], the target slave id MAA_slaveid[2:01] of the prospective transaction, and the priority of the transaction MAA_pri [1:0]. Depending on the complexity of the arbiter, it may or may not choose to use this information. The transaction type and slave id would be used by an arbiter in a system that wants to minimize wasted cycles on the bus. That is, the arbiter also maintains a set of credit counters (as shown above in FIG. 7) for the slaves, and checks credit status before granting the request from a master targeted to a particular slave for a specific transaction type. With this type of arbitration, the arbiter is designed to prevent starvation and to be fair.

The priority bits are used if the arbiter implements a priority based arbitration algorithm, such as round robin arbitration at different priority levels. The two bits of priority allow the implementation of 4 priority levels. The simplest arbiter could ignore the priority bits and assume that all requests are at the same level and implement a round robin algorithm among all the masters. A more complex arbiter might implement two priority levels and hence ignore one of the two priority bits, and implement round robin among the two levels. That is, as long as there are requests at the higher priority level, they are granted and requests at the lower priority level must wait until there are no requests pending at the higher level. A configuration bit (not shown) in each bus interface specifies the number of priority levels that the arbiter; in the current implementation will accept.

The address bus consists of 65 signals (for a 64-bit data bus). These include AB_addr[33:0] for the address. The lower 2 bits of the address are not needed since the data bus width is 8 bytes with 8 bits of byte mask (or 16 bytes wide with 16 bits of bytemask, or 4 bytes wide with 4 its of bytemask). This system uses 34 bits to address a 6-bit wide address. Other systems may use wider addresses. In such systems, this expanded addressing capability can be accommodated by simply expanding the width of the address lines.

Since the bus architecture supports a maximum of eight drops, three bits AB_slaveid[2:0] are sufficient to address the slave device. The transaction id AB_trid[7:0] consists of 3 bits of master id to uniquely specify the master that originated the transaction, and 5 bits of transaction id, to uniquely track up to 32 outstanding transactions from a specific master.

The AB_bytemask field is used to indicate the position and size of data on the 8 byte wide data bus (assuming a 64-bit data bus, 8 bits of byte mask are required). If all the AB_bytemask bits are zero, this implies a full data bus width transaction. If any of these bits are not zero, then the position and number of the zero bits indicate the position and size of the data in the total width. A transaction is said to stream data when a single address is used to transmit more than one cycle of data on the data bus. When streaming data, not all bytemask values are valid.

Data Bus Protocol

A generator of data (a source) uses the data bus to transmit the data to a sink, who accepts the data. The basic data bus protocol is a little different from the address bus protocol. The main differences are: the explicit use of a release signal by a source to relinquish the data bus; multi-cycle burst transactions; and no separate flow control for data bus transactions. Rather, the flow control of data bus transactions are implicitly tied to address transactions. A slave configuration register (discussed above in FIG. 7) holds the length of bursts supported by a slave per address transaction for write operations. A master must guarantee buffer space for read-return data from a slave. For a more complete description of the configuration register, please see U.S. patent application Ser. No. 09/373,095 entitled BURST CONFIGURABLE DATA BUS, referenced above.

The initial steps of the request-grant-data-release protocol sequence works as it did for the address bus. That is, when a source wants to use the bus it asserts a request signal MDA_req to the data bus arbiter. The arbiter grants the request DAM_gnt two cycles or later. Two cycles after the source sees grant, it begins to use the data bus. Once the source obtains the data bus, it can continue to use it until the arbiter takes away grant. After the arbiter takes away grant, the source can continue to hold the data bus until it completes its current transaction. During its last cycle of use of the data bus, the source asserts the release signal D_B release. This implies that the data bus is available for use by another source two cycles after the release signal. For a more complete description of the release signal, please see U.S. patent application Ser. No. 09/373,093 entitled DATA RELEASE TO REDUCE LATENCY, referenced above. The cycle after release is the bus turn around cycle. When other sources are requesting the bus, the arbiter asserts grant for a cycle and deasserts it while asserting it to the next source. The second source cannot use the data bus until it sees the release signal from the current source on the bus. The arbiter needs to keep the grant signal asserted at the second source until the first source releases the bus.

Read Request Protocol

Having described the on-chip system bus for the present invention, and particular performance improving aspects of the bus interface, an example of a read operation will now be presented that illustrates the bus interface in operation. The flow of a typical read operation is:

1. The Master that wants to read, requests the address bus arbiter for the address bus. It signals the id of the target slave, a priority, and the type of operation, i.e., Read.
2. The arbiter issues a grant to the requesting Master. This grant is based on whether the Master has received its turn in the arbitration scheme per its priority level. On receiving grant, the Master can drop its request line, or keep it asserted if it has another request that it needs to make.
3. The Master puts the read address out on the address bus.
4. When the Slave is ready with the read data, it requests the data bus from the data bus arbiter along with a priority. It uses the same priority bits that it obtained from the master during the address transaction.
5. The data bus arbiter grants the data bus to the slave per the arbitration logic.
6. The Slave puts the first 8 bytes of data out on the data bus when it has seen Release and has grant.

Referring to FIG. 10, a timing diagram 1000 is resented illustrating the read protocol on the OCS bus. The control signals in FIG. 10 are presented as active HIGH. A read is shown to begin when a processor requests access to the address bus by asserting MAA_req at clock cycle 1.

At clock cycle 3, the arbiter grants the processor access to the address bus by asserting AAM_gnt.

At clock cycle 5 (2 clock cycles after seeing grant) the processor initiates a read by indicating a read command on AB_cmd. While not shown, it should be understood that the processor also presents the address of the read on the address lines of the OCS bus. Also shown at clock cycle 5 is the data release line DB_release. This indicates that another device that is responding to a previous request is completing the request and releasing the data bus. In addition, the processor P0 becomes master of the address bus, and drives a read command Rd1 on the command lines. In addition, the processor P0 drives the address associated with Rd1 on the address lines of the OCS bus, and places the transaction ID associated with the request on SysCmdID.

At clock cycle n, the slave device, that is the target of the read, requests access to the data bus by asserting SDA_req.

At clock cycle n+2, the arbiter grants the slave access to the data bus by asserting DAS_gnt. Note, since the data bus is inactive when the slave requested access, grant is asserted two clock cycles after the request is made.

At clock cycle n+4, the slave device begins driving data on the data bus. In this illustration, the slave device requires 4 clock cycles to fulfill the read request, and performs the request in a 4 cycle burst. In this instance the slave device was able to begin transferring data 2 cycles after seeing assertion of DAS_gnt since it had already recorded assertion of DB_release in clock cycle 5.

At clock cycle n+8, commensurate with the last clock cycle of data transfer, the slave device asserts DB_release indicating that it no longer requires access to the data bus.

Write Request Protocol

A write operation is very similar to the read operation shown above. The typical flow of a write operation on the OCS bus is:

1. The master that wants to write requests the address bus. In addition, it signals the id of the target slave, a priority, and the type of operation, i.e., Write.
2. The arbiter issues a grant to the requesting master. This grant is based on whether the master has received its turn in the arbitration scheme per its priority level. On receiving the grant, the master can either drop its request line, or keep it asserted if it has another request to make.
3. The master puts the write address out on the address bus. In the same cycle, it requests the data bus from the data bus arbiter along with a priority. It uses the same or higher priority used to obtain the address bus.
4. The data bus arbiter grants the data bus per the arbitration logic.
5. The master puts the first 8 bytes of data on the data bus when it has seen DB_release and has grant.

OCS Bus Summary

Figure 11:
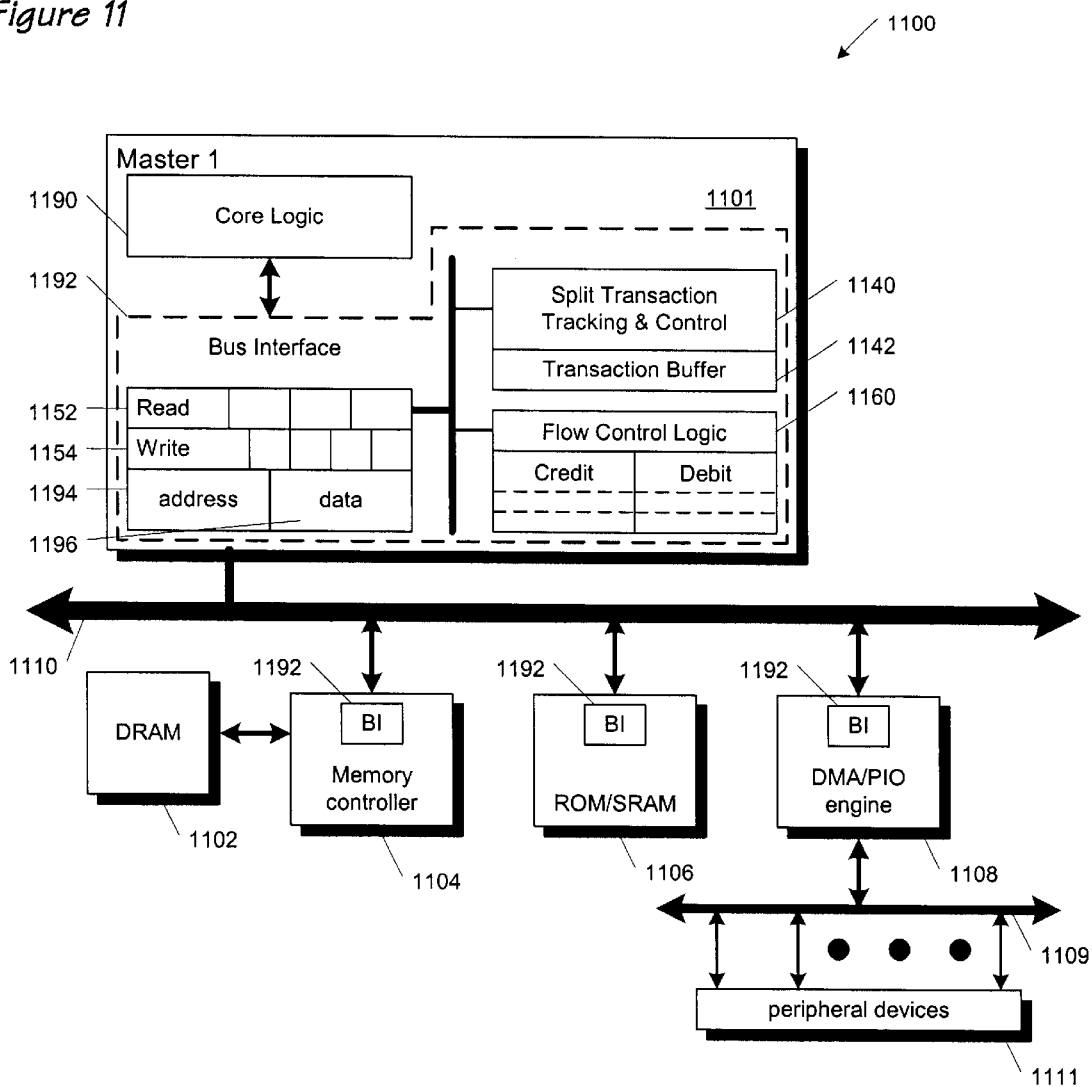
FIG. 11 is a block diagram of a master device designed to interface to the on-chip system bus of the present invention.

Referring now to FIG. 11, a block diagram 1100 is shown of a processor 1101 that incorporates all of the novel bus features of the present invention. The processor 1101 is coupled to other devices 1102–1111, as described above with reference to FIG. 3, via a system bus 1110. While not explicitly shown, it should be appreciated that each of the devices on the system bus 1110 have a corresponding bus interface 1192 to allow them to communicate with other devices according to the protocol described above.

The processor 1101 includes core logic 1190 coupled to a bus interface 1192. The bus interface 1192 includes an address portion 1194 and a data portion 1196. The bus interface 1192 also includes a read queue 1152 and a write queue 11154. Within (or coupled to) the bus interface 1192 are also a split transaction tracking and control 1140 having a transaction buffer 1142, and flow control logic 1160. Each of the elements shown in FIG. 1100 operate as described above with reference to FIGS. 3–10.

In addition to implementations of the invention using hardware, the invention can also be embodied in an article of manufacture comprised of a computer usable medium configured to store a computer-readable program code. The program code causes the enablement of the functions or fabrication, or both, of the hardware disclosed in this specification. For example, this might be accomplished through the use of general programming languages (e.g., C, C++, and so on), hardware description language (HDL), register transfer languages (RTL), Verilog HDL, VHDL, AHDL (Altera Hardware Description Language), or other programming and/or circuit (i.e., schematic) capture tools available in the art. A book entitled "A Verilog HDL Primer" by J. Bhasker, Star Galaxy Pr., 1997 provides greater detail on Verilog HDL, and is incorporated herein by reference in its entirety for all purposes.

It is understood that the functions accomplished by the invention as described above could be represented in a core which could be utilized in programming code and transformed to hardware as part of the production of integrated circuits. Also, other implementations of the invention using a combination of hardware and software are also possible. Therefore, the embodiments expressed above are within the scope of the invention and should also be considered protected by this patent.

In addition, the discussion above often presents a single processor coupled to other devices via a system bus. One skilled in the art will appreciate that in all cases where a single processor is shown, multiple processors are anticipated. The single processor illustration merely provided a convenient method for pointing out a particular aspect of the invention.

In addition, elements of the OCS bus of the present invention have been described both separately, and together. These include: split-transactions, transaction ID's, credit based flow control, data release, etc. Applicants anticipate that these novel features may be combined in a variety of ways, depending on the needs of the computing environment into which the OCS bus will be used.

Furthermore, the bus of the present invention has been particularly described with reference to a master processor and a slave. However, one skilled in the art will appreciate that any type of device, whether slave or master (or both slave and master), that requires on-chip access to other devices, may be designed to incorporate the novel features of the present invention by providing an interface to the OCS bus as described above.

And, the bus of the present invention has been particularly described with reference to an on-chip bus. One skilled in the art should appreciate however, that the novel aspects of the scalable bus, as described above, may be implemented either partially, or entirely off chip, without departing from the solution provided by the present invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A split transaction system bus for an on-chip computing environment having separate address and data buses, the system bus having a master device configured to communicate with a slave, the master device comprising:

a bus interface, for coupling the master device to the system bus, and for allowing the master device to communicate with the slave; and split transaction tracking and control, coupled to said bus interface, for establishing transaction ID's for transactions to be presented on the system bus, wherein said transactions have split address and data portions;

wherein said address portions of said transactions are presented on the system bus with associated ones of said transaction ID's.

2. The system bus as recited in claim 1 wherein said bus interface is incorporated within the on-chip master device.

3. The system bus as recited in claim 1 wherein said split transaction tracking and control comprises:
   means for generating said transaction ID's so that they may be presented along with said transactions on the system bus.

4. The system bus as recited in claim 3 wherein each of said transactions that are pending on the system bus has a unique one of said transaction ID's.

5. The system bus as recited in claim 1 wherein said split address and data portions of said transactions are presented separately to the address and data buses.

6. The system bus as recited in claim 1 wherein said transactions comprise:
   a memory read;
   a memory write;
   an I/O read; or
   an I/O write.

7. The system bus as recited in claim 1 wherein said transaction ID's comprise:
   a device ID, for identifying a device that initiates one of said transactions; and
   a transaction tag, for identifying a particular one of said transactions.

8. The system bus as recited in claim 7 wherein said transaction tag comprises a 5-bit field for identifying up to thirty two distinct transactions.

9. The system bus as recited in claim 8 wherein one of said transaction ID's is presented along with said data portion for its associated one of said transactions.

10. A split transaction system bus for an on-chip computing environment having separate address and data buses, the system bus having a master device configured to communicate with a slave, the master device comprising:
    a bus interface, for coupling the master device to the system bus, and for allowing the master device to communicate with the slave; and
    flow control logic, coupled to said bus interface, for determining whether devices being read from, or written to, by transactions, have buffers currently available to respond to said transactions;
    wherein if said flow control logic determines that said devices do not have buffers currently available to respond to said transactions, said flow control logic causes said transactions to not be presented on the system bus until said buffers are available.

11. The system bus as recited in claim 10 wherein said flow control logic comprises:
    a plurality of read credit counters, for tracking the number of available read buffers in said devices; and
    a plurality of write credit counters, for tracking the number of available write buffers in said devices.

12. The system bus as recited in claim 11 wherein each of said read credit counters is associated with one of said devices having said read buffers.

13. The system bus as recited in claim 12 wherein each of said write credit counters is associated with one of said devices having said write buffers.

14. The system bus as recited in claim 11 wherein as transactions are presented to said devices, said flow control logic reduces the number of available read/write buffers for said devices in said plurality of credit read/write credit counters, respectively.

15. The system bus as recited in claim 11 wherein as said devices complete said transactions, and clear said number of said available read/write buffers, said flow control logic increases said number of available read/write buffers for said devices in said plurality of credit read/write credit counters, respectively.

16. The system bus as recited in claim 15 wherein said devices provide said flow control logic with read/write credit signals as said read/write buffers are cleared.

17. A split transaction system bus for an on-chip computing environment having separate address and data buses, the system bus having a master device configured to communicate with a slave, the master device comprising:
    6 split transaction tracking and control, coupled to the system bus, for establishing transaction ID's for transactions to be presented on the system bus, wherein said transactions have split address and data portions; and
    flow control logic, coupled to the system bus, for determining whether devices being read from, or written to, by said transactions, have buffers currently available to respond to said transactions;
    wherein if said flow control logic determines that said devices do not have buffers currently available to respond to said transactions, said flow control logic causes said transactions to not be presented on the system bus until said buffers are available.

18. An on-chip split transaction system bus having separate address and data buses, for allowing out-of-order completion of split address/data transactions, a bus interface for the system bus comprising:
    split transaction tracking and control for generating a transaction ID to be associated with each address provided by the bus interface to the address bus, and for examining transaction ID's that are associated with data on the data bus to determine whether said data on the data bus corresponds to a transaction initiated by the bus interface; and
    flow control logic, coupled to the bus interface, for determining whether devices that are to be read from, or written to, by transactions to be initiated by the bus interface have buffers currently available to respond to said transactions.

19. The system bus as recited in claim 18 wherein if said split transaction tracking and control determines that said data on the data bus corresponds to said transaction initiated by the bus interface, said split transaction tracking and control causes said data to be latched by the bus interface.

20. The system bus as recited in claim 18 wherein transaction ID's generated by said split transaction tracking and control are unique for all pending transactions.

21. The system bus as recited in claim 18 wherein if said flow control logic determines that said devices that are to be read from, or written to, by said transactions to be initiated by the bus interface, do not have buffers currently available, said flow control logic causes said transactions to wait until said buffers are available.

22. The system bus as recited in claim 18 wherein said flow control logic further comprises:
    a plurality of read credit counters, for tracking the number of available read buffers in said devices; and
    a plurality of write credit counters, for tracking the number of available write buffers in said devices.

23. A computer program product for use with a computing device, the computer program product comprising:
    a computer usable medium having computer readable program code embodied in said medium for causing an on-chip computing bus to be described, said computer readable program code comprising:

first computer readable program code for providing split transaction tracking and control to establish transaction ID's for transactions to be presented on the on-chip computing bus having address and data buses, wherein said transactions have split address and data portions; and second computer readable program code for providing flow control logic to determine whether devices being read from, or written to, by said transactions, have buffers currently available to respond to said transactions.

24. The computer program product, as recited in claim 23 wherein said split transaction tracking and control comprises:

means for generating said transaction ID's that may be presented along with said transactions on the computing bus.

25. The computer program product, as recited in claim 23 wherein if said flow control logic determines that said devices do not have buffers currently available to respond to said transactions, said flow control logic causes said transactions to wait until said buffers are available.

26. A method for allowing out-of-order completion of split address/data transactions on an on-chip system bus having separate address and data buses, the method comprising:

providing a bus interface to the on-chip system bus;

generating a transaction ID to be associated with each address provided by the bus interface to the address bus;

examining transaction ID's that are associated with data on the data bus to determine whether the data on the data bus corresponds to a transaction initiated by the bus interface; and determining whether devices that are to be read from, or written to, by transactions initiated by the bus interface have buffers currently available to respond to said transactions.

27. The method of claim 26 further comprising:

latching the data on the data bus, if it corresponds to a transaction initiated by the bus interface.

28. The method of claim 26 further comprising:

if said step of determining determines that devices to be read from, or written to, do not have buffers currently available, delaying issuance of said transactions.

* * * * *